(12) United States Patent
Mendez et al.

(10) Patent No.: US 8,590,927 B2
(45) Date of Patent: Nov. 26, 2013

(54) AIRBAG MODULE

(75) Inventors: Gerardo Mendez, West Bloomfield, MI (US); Amy L. Klinkenberger, Highland, MI (US)

(73) Assignee: TK Holdings Inc., Auburn Hills, MI (US)

( * ) Notice: Subject to any disclaimer, the term of this patent is extended or adjusted under 35 U.S.C. 154(b) by 211 days.

(21) Appl. No.: 13/089,140

(22) Filed: Apr. 18, 2011

(65) Prior Publication Data

US 2011/0254256 A1    Oct. 20, 2011

Related U.S. Application Data

(60) Provisional application No. 61/325,628, filed on Apr. 19, 2010.

(51) Int. Cl.
*B60R 21/276* (2006.01)

(52) U.S. Cl.
USPC .................................. 280/739; 280/743.2

(58) Field of Classification Search
USPC ............................... 280/739, 743.2
See application file for complete search history.

(56) References Cited

U.S. PATENT DOCUMENTS

| | | | |
|---|---|---|---|
| 6,290,257 B1 * | 9/2001 | Bunce et al. | 280/739 |
| 6,648,371 B2 | 11/2003 | Vendely et al. | |
| 6,773,030 B2 * | 8/2004 | Fischer | 280/739 |
| 6,971,671 B2 | 12/2005 | Schneider et al. | |
| 7,419,184 B2 | 9/2008 | Green et al. | |
| 7,448,646 B2 | 11/2008 | Hall et al. | |
| 7,475,906 B2 * | 1/2009 | Goto et al. | 280/743.2 |
| 7,552,942 B2 | 6/2009 | Fischer et al. | |
| 7,591,482 B2 | 9/2009 | Thomas et al. | |
| 7,600,782 B2 * | 10/2009 | Ishiguro et al. | 280/739 |
| 7,607,690 B2 * | 10/2009 | Abe et al. | 280/739 |
| 7,635,148 B2 | 12/2009 | Sager | |
| 7,770,926 B2 * | 8/2010 | Schneider et al. | 280/743.2 |
| 2007/0013177 A1 * | 1/2007 | Abe | 280/739 |
| 2009/0256340 A1 | 10/2009 | Williams et al. | |
| 2010/0078924 A1 | 4/2010 | Mitsuo et al. | |

FOREIGN PATENT DOCUMENTS

JP       2009-214719 A        9/2009

OTHER PUBLICATIONS

Tether Released Air Bag Vent Concepts, Research Disclosure Database No. 459065, Research Disclosure Journal, ISSN 0374-4353, Jul. 2002, 3 pages, Kenneth Mason Publications Ltd.
Non-Final Office Action U.S. Appl. No. 13/493,574 dated Dec. 20, 2012.
Notice of Allowance U.S. Appl. No. 13/493,574 dated Mar. 26, 2013.

* cited by examiner

*Primary Examiner* — Drew Brown
(74) *Attorney, Agent, or Firm* — Foley & Lardner LLP

(57) ABSTRACT

The invention relates to an airbag system including an airbag including a vent and a vent cover, an actuator, and a tether. The tension can be applied to the tether when the actuator has not been activated. Further, when the actuator has not been activated, the vent is closed by the vent cover due to the tension applied to the tether connected to the vent cover. The actuator is configured, once inflation gas is supplied to inflate the airbag, to reduce or release the tension applied to the tether when the actuator is activated. The vent cover is configured to remain in position when the actuator has been activated until the inflation gas forces the vent open. The vent cover is configured to maintain the vent in a closed state when the actuator has not been activated. In addition, the vent cover can be located on an exterior surface of the airbag.

19 Claims, 8 Drawing Sheets

AIRBAG MODULE

This application claims priority to and the benefit of U.S. Provisional Patent Application No. 61/325,628, filed Apr. 19, 2010, incorporated by reference herein in its entirety.

BACKGROUND

One issue addressed by airbag systems is the amount of internal pressure within an airbag during inflation of the airbag. For example, if an airbag has a relatively high internal pressure, it is possible for an occupant to suffer an injury when the occupant contacts the airbag, such as a head injury. Airbag systems and designs have addressed this issue by venting airbags when airbags inflate and providing airbags with fixed vents, passive vents, and active vents. Further improvements can be made in airbag system design to further reduce occupant injuries. In addition, further improvements can be made to accommodate occupants of various sizes and to accommodate occupants out of position in a vehicle.

SUMMARY

The present application relates generally to the field of airbags for use in motor vehicles. More specifically, this application relates to an airbag module with an electromechanical active cushion venting mechanism to control internal chamber pressure of the airbag cushion to reduce acceleration and forces of the occupant, such as the head and neck of the occupant, during airbag deployment to improve occupant safety.

According to an example, an airbag system for a vehicle comprises an airbag including a vent and a vent cover configured to close the vent, an actuator, and a tether. The tether can be connected between the actuator and the vent cover such that tension is applied to the tether when the actuator has not been activated. Further, when the actuator has not been activated, the vent is closed by the vent cover due to the tension applied to the tether connected to the vent cover. The actuator is configured, once inflation gas is supplied to inflate the airbag, to reduce or release the tension applied to the tether when the actuator is activated. The vent cover is configured to remain in position when the actuator has been activated until the inflation gas forces the vent open. The vent cover is configured to maintain the vent in a closed state when the actuator has not been activated. In addition, the vent cover can be located on an exterior surface of the airbag.

The tether can be connected between the actuator and the vent cover such that tension is applied to the tether when the actuator has not been activated. When the actuator has not been activated, the vent can be closed by the vent cover due to the tension applied to the tether connected to the vent cover. Once inflation gas is supplied to inflate the airbag, the actuator is configured to reduce or release the tension applied to the tether when the actuator is activated. The vent cover is configured to remain in position when the actuator has been activated until the inflation gas forces the vent open. The vent cover is configured to maintain the vent in a closed state when the actuator has not been activated.

DETAILED DESCRIPTION

Airbag systems or modules are well known for providing improved occupant protection during a dynamic vehicle event, such as a frontal or side impact. Airbag modules provide improved occupant protection or safety, during a dynamic vehicle event, by including an inflatable airbag cushion or airbag that deploys and inflates from gas rapidly pushed into the airbag cushion by means of an inflator, whereby the cushion deploys between the occupant being protected and another portion of the vehicle, such as the dashboard or door assembly.

The airbag cushion may reduce displacement and acceleration of the occupant reducing the forces and absorbing energy upon impact by the occupant. An inflator or module may use a device, such as a pyrotechnic device or other airbag inflation device, to generate gas almost instantaneously and to push the gas at a high volumetric flow rate into the inflatable airbag cushion of the airbag system. Airbags may be used to provide protection to any occupant located in any seating row (e.g., first, second, third) of a vehicle.

Airbag modules and airbag cushions may be stored within and deployed from any vehicle component, such as the dashboard of steering column. Airbags are typically packaged through a process of folding and rolling to compact the airbag in order for it to fit into the small cross-section of the storage area.

The airbag systems and modules disclosed herein can include electromechanical active cushion venting mechanisms to control the internal pressure of the airbag cushion relative to time, during airbag deployment, to improve occupant protection. For example, vehicle sensors may monitor crash severity and may communicate such measured input parameters to a vehicle device, such as a control module, which may determine crash severity, then communicate with the airbag module to tailor the airbag internal pressure through the electromechanical active cushion venting mechanism. The active venting mechanism may control the amount of gas permitted to escape through the active vent hole by adjustment of the vent hole cover, to tailor the internal airbag pressure to provide optimal occupant protection based on the crash severity of the vehicle. The active venting mechanism may prohibit or substantially limit inflation gas from escaping the airbag cushion, during the initial moments of vehicle impact, in order for the internal pressure to build rapidly to increase the speed of deployment and initial restraint of the occupant. The active venting mechanism may subsequently control displacement of the vent hole cover to permit a predetermined amount of inflation gas to escape to reduce the internal pressure of the airbag cushion, which improves the ride down of the occupant load and reduces the head acceleration, relative to a cushion having a higher stiffness or internal pressure.

Figure 1:
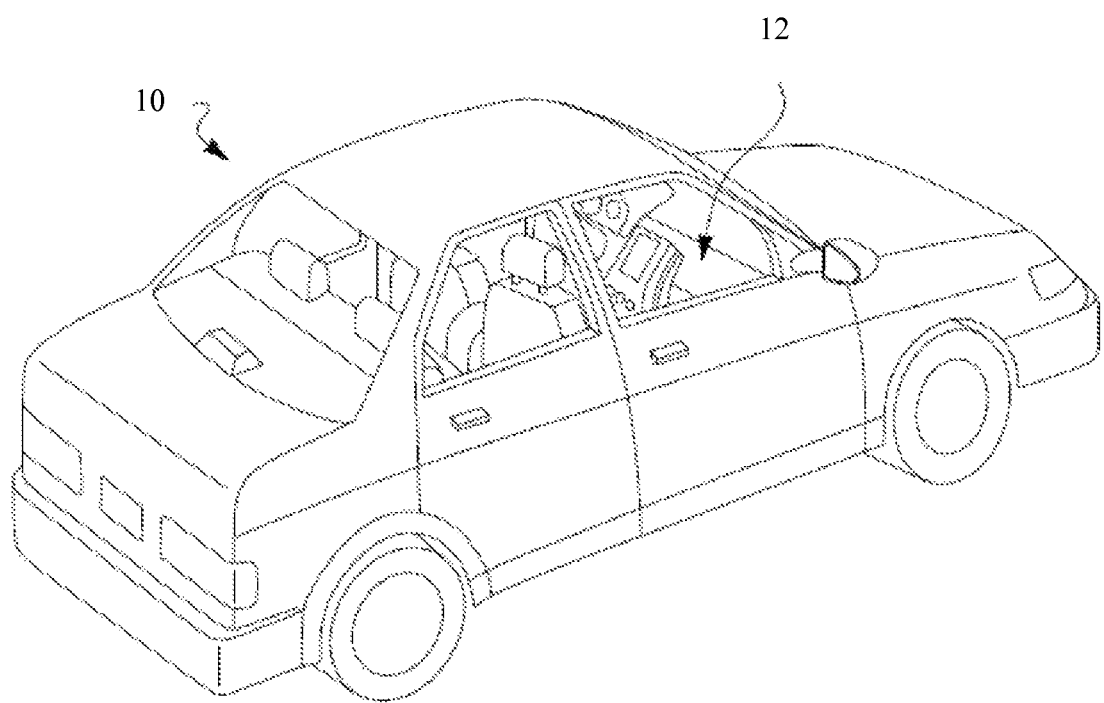
FIG. 1 is a perspective view of an exemplary motor vehicle having an airbag module.

FIG. 1 shows an example of a motor vehicle 10 which includes a passenger compartment having at least one airbag system or module 12, configured to provide occupant protection. The vehicle illustrated may be a typical sedan, but the airbag modules disclosed herein may be included in any motor vehicle having at least one occupant. Additionally, the airbag modules disclosed herein may be used to provide occupant protection during any vehicle impact event (e.g., frontal impact, side impact) and may protect any occupant (e.g., driver, passenger), as the illustrations herein are not meant as limitations.

Figure 2:
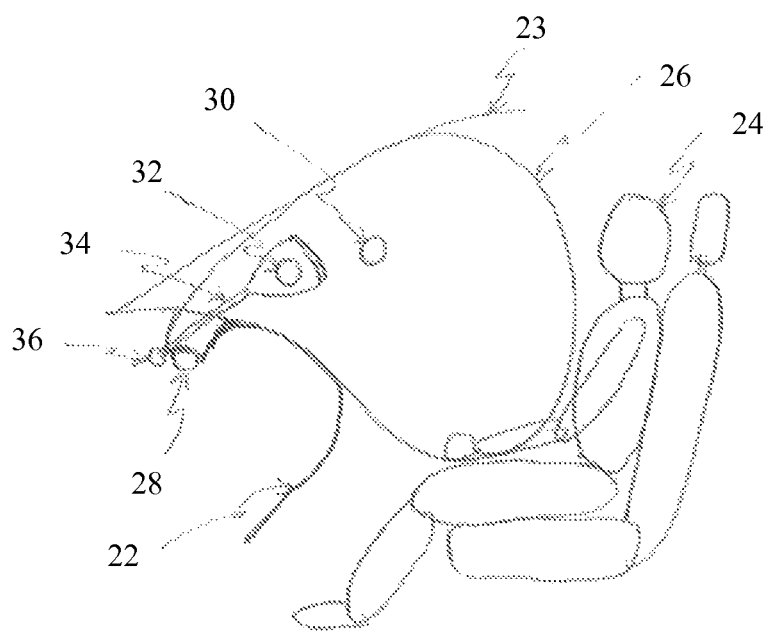
FIG. 2 is a side view of a passenger compartment of a motor vehicle illustrating an example of an airbag system or module having an electromechanical active cushion venting mechanism, with the airbag cushion shown deployed or unfolded.

FIG. 2 shows a side view of an example of a passenger compartment of a motor vehicle which includes an airbag system or module 20. The airbag module 20 is shown in a deployed state from the instrument panel 22 of the vehicle, providing a degree of front impact protection to the seated occupant 24.

According to an example, the airbag system or module may include an airbag cushion or airbag 26, an inflator for inflating the airbag cushion, and an electromechanical active cushion venting mechanism. As shown in the example of FIG. 2, the airbag 26 can extend along the interior of the windshield 23 of a vehicle when the airbag 26 deploys and inflates. The airbag cushion 26 may comprise one or a plurality of panels made from conventional airbag material, such as a high-strength woven fabric, coupled together by stitching (or other suitable methods) to form at least one inflatable portion or chamber. The airbag cushion may be coupled to an inflator 28, so that inflation gas generated by the inflator flows into and expands the inflatable portion of the airbag cushion 26, increasing the internal pressure of the cushion, while unfolding and deploying the airbag cushion 26 to provide a degree of protection to an occupant. According to another example, activation of the airbag system or module by another vehicle device, such as a control module, may initiate the inflator 28 to inflate the airbag cushion 26. The airbag cushion 26 may include one or a plurality of apertures or vent holes to permit inflation gas to escape during airbag deployment. The vent holes may be configured to form any suitable shape, such as round, and any suitable size. Thus, vent hole configuration may be tailored to specific performance characteristics. For example, the airbag 26 can include, as shown in the example of FIG. 2, a primary vent 30 and an active venting vent 32.

Figures 3, 3B:
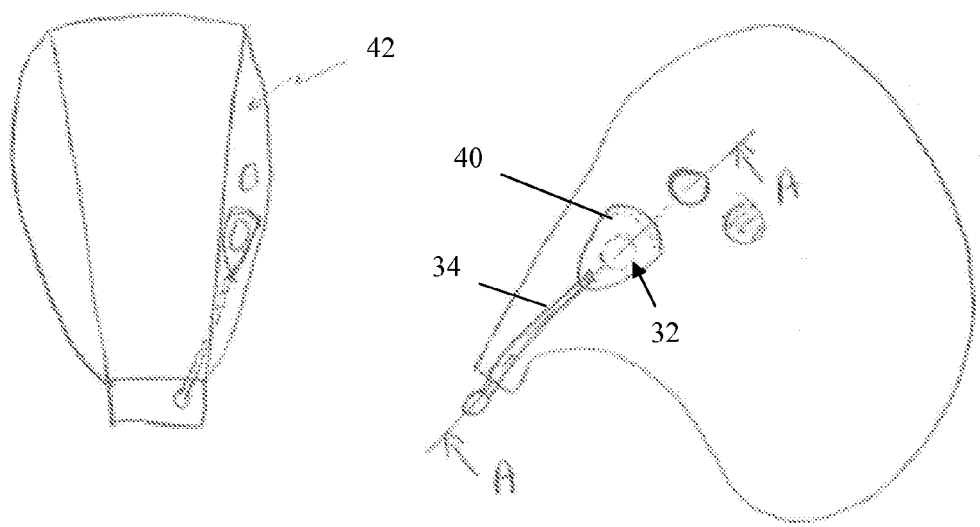
FIG. 3 is a side view of the airbag system or module of FIG. 2 shown deployed or unfolded.
FIG. 3B is a front view of the airbag module of FIG. 3 shown deployed or unfolded.

According to an example, the airbag system or module 20 includes an electromechanical active cushion venting mechanism includes a vent hole cover or vent cover 40, a strap (or tether) 34, and a release mechanism or actuator 36. As shown in the drawings, the vent cover can be external to the airbag. In addition, the tether 34 can be located, for example, within an interior of the airbag and can remain within an interior of the airbag during inflation of the airbag and use of the electromechanical active cushion venting mechanism. For example, the tether 34 can be located within an interior the airbag before inflation of the airbag and can remain within the interior of the airbag during inflation of the airbag and use of the electromechanical active cushion venting mechanism, except for the portion of the tether 34 connected to an external cover 40. The actuator 36 can be, for example, a pyrotechnic actuator or other actuator used in the art. FIG. 3 shows a side view of the airbag system 20 of FIG. 2 with an example of the vent cover 40 in detail. FIG. 3B shows a front view of the of the airbag system 20 of FIG. 2, with the venting mechanism located on a side panel 42 of the airbag 26. The vent hole cover 40 may be made of high-strength woven fabric or other suitable material and is configured to cover the vent hole to prohibit inflation gas from escaping through the vent hole of the airbag cushion. The size and shape of the vent hole cover 40 may be tailored based on the size and shape of the vent hole 32.

Figure 3A:
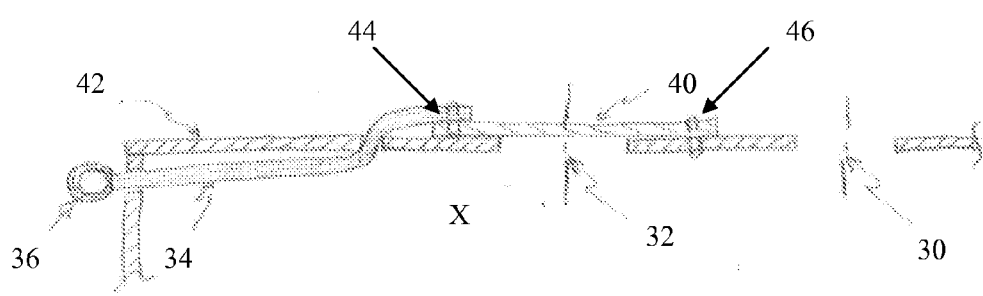
FIG. 3A is a sectional view of the airbag module of FIG. 3, taken along line A-A.

As shown in the example of FIG. 3A, the vent hole cover 40 may be coupled, such as, for example, by stitching 44, at one end to the tether 34 and coupled, such as by stitching 46, at another end to the airbag cushion 26 to maintain a position of the vent hole cover 40 to cover the vent hole 32 of the cushion. Such a connection to couple the vent cover 40 to the airbag 26 can result in a tension being applied to the tether 34 due to the tether 34 being connected between the vent cover 40 and the actuator 36 when the actuator 36 has not been activated. Thus, the tether 34 can be connected between the actuator 36 and the vent cover 40 such that tension is applied to the tether 34 when the actuator 36 has not been activated. In turn, the tension applied to the tether 34 can also be applied to the vent cover 40. Thus, when the actuator 36 has not been activated, the vent 32 can be closed by the vent cover 40 due to the tension applied to the tether 34 connected to the vent cover 40. As shown in the example of FIG. 3A, the vent cover 40 can be located on an exterior surface of the airbag 26. The vent cover 40 is configured to maintain the vent 32 in a closed state when the actuator 36 has not been activated. The tension applied to the tether 34, and in turn the vent cover 40, is sufficient to maintain the vent 32 in a closed state when the actuator 36 has not been activated, despite the inflation gas supplied to inflate the airbag 26 on the gas side X of the airbag 26.

For example, the vent hole cover or vent cover 40 may be coupled to the airbag cushion, such as by stitching 46, at the end of the vent cover 40 opposite to the end which is coupled to the tether 34, so that the coupling, such as the stitching 46, between the vent hole cover 40 and the cushion acts like a hinge. As a result, when tension on the strap or tether 34 is reduced, the pressure exerted from the inflation gas onto the vent cover 40 can overcome the reduced tension in the strap or tether 34, causing the vent cover 40 to be moved or displaced away from the vent hole 32. Otherwise, the vent cover 40 is configured to remain in position when the actuator 36 has been activated until the inflation gas forces the vent 32 open, due to the coupling of the vent cover 40 to the airbag 26.

For example, once the actuator 36 has been activated to reduce or release the tension applied to the tether 34, the pressure of the inflation gas within the airbag 26 can cause the vent cover 40 to move relative to the vent 32. For example, the vent cover 40 can slide relative to the vent 32 when the vent cover 40 is moved by the inflation gas. According to another example, the vent cover 40 can pivot relative to the vent, such as about the coupling connecting the vent cover 40 to the airbag 26.

An open position of the vent hole cover 40 permits inflation gas to escape through the vent hole, which reduces the internal pressure of the airbag cushion. Such reduced pressure can advantageously be used to reduce the firmness of the airbag to accommodate different sizes of occupants, occupants out of positions, or to generally reduce injuries to an occupant. Conversely, tension in the strap may be maintained by the active venting mechanism or actuator 36, so that the tension overcomes the pressure exerted on the vent hole cover by the inflation gas, to maintain the vent hole cover 40 over top of and covering the vent hole 32, thus prohibiting inflation gas from escaping through the vent hole 32. Therefore, this closed position of the vent hole cover 40 can cause inflation gas to remain trapped inside the airbag chamber, thus increasing the internal pressure (and stiffness) of the airbag cushion.

Figure 4:
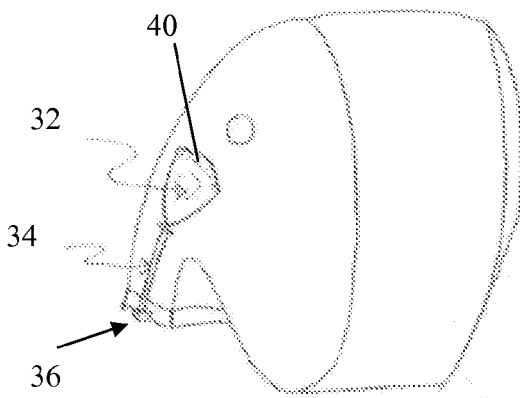
FIG. 4 is a perspective view of an example of an airbag system or module, shown deployed or unfolded, having an electromechanical active cushion venting mechanism illustrated in the closed position.
Figure 4A:
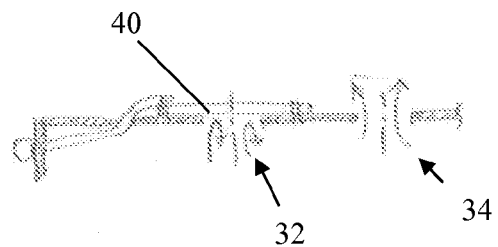
FIG. 4A is a sectional view of the airbag system or module of FIG. 4.

FIG. 4 shows an example of an airbag system in which the deployment and inflation of the airbag of the airbag system has been initiated and the vent cover 40 remains in a closed position to close the vent 32. In such a state the actuator 36 has not been actuated to reduce or release the tension applied to the tether 34, causing the tether 34 to remain under tension and the vent cover 40 to remain in a closed position to cover the vent 32. FIG. 4A shows a sectional view of the airbag system of FIG. 4, which shows the vent cover 40 in the closed position to cover the vent 32 and prevent or substantially prevent inflation gas on the gas side X of the airbag from venting through the vent 32.

Figure 5:
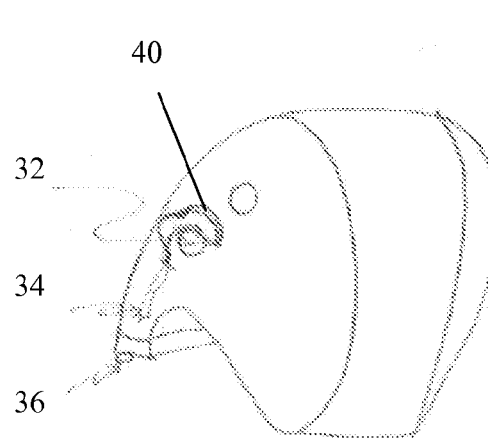
FIG. 5 is a perspective view of an example of an airbag system or module, shown deployed or unfolded, having an electromechanical active cushion venting mechanism illustrated in the open position.
Figure 5A:
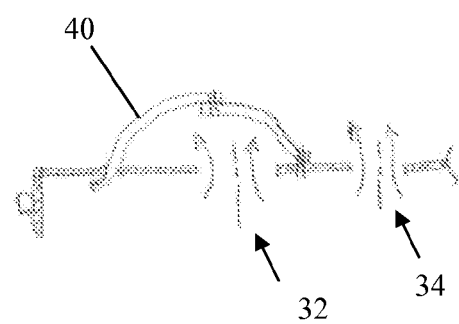
FIG. 5A is a sectional view of the airbag module of FIG. 5.

FIG. 5 shows an example of an airbag system in which the deployment and inflation of the airbag of the airbag system has been initiated but the vent cover 40 has been moved to an open position to allow inflation gas to vent through the vent 32. For example, the actuator 36 has been activated to reduce or release the tension applied to the tether 34, which in turn reduces or release the tension or force applied to the vent cover 40. In such a state, as shown in the examples of FIG. 5 and FIG. 5A, the force and pressure exerted by the inflation gas within the airbag can be sufficient to move the vent cover 40 so that vent cover 40 is moved to an open position which permits inflation gas to vent through the vent 32. For example, the inflation gas can cause the vent cover 40 to slide relative to the airbag, such as to a side of the vent 32, to lift above the vent, such as to provide a clearance between the opening of the vent 32 and the vent cover 40, to swing open like a door on a hinge, or by other movements.

The tension of the strap or tether 34 may be controlled by the electromechanical active cushion venting mechanism. As shown in the examples of the drawings, the tether may include a first end coupled to the vent hole cover and a second end coupled to a release mechanism or actuator. For example, a length of the strap or tether may be tailored based on the distance, when the airbag is deployed, from the actuator to the vent hole cover. The tether may be positioned inside the airbag cushion, on the outside of the airbag cushion, or may pass from the one-side of the cushion to the other-side of the cushion through a slit or aperture in the cushion panel.

The release mechanism or actuator may communicate with another vehicle device, such as the control module, whereby the control module may actuate the actuator, such as during a vehicle dynamic event which triggers airbag deployment, based on input from vehicle sensors. When the actuator is actuated, the actuator reduces or releases the tension applied to the tether, which allows the end of the tether coupled to the actuator to move freely. Thus, the vent cover is permitted to move to the open position, such as when the pressure of the inflation gas within the airbag causes the vent cover to move aside, whereby the inflation gas may escape through the vent hole. When the actuator has not actuated, the end of the tether or strap coupled to the actuator may be prohibited from moving freely, such that the tether may be subjected to tension. Thus, the vent cover can remain in a position to cover the vent hole to prohibit the escape of inflation gas through the vent hole.

According to another example, an electromechanical active cushion venting mechanism includes a vent hole cover, a strap (or tether), and a displacement mechanism or actuator. The vent hole cover may be configured as discussed herein. The strap may include a first end and second end. The first end of the strap may couple to the vent hole cover as discussed herein, and the second end of the strap may couple to the displacement mechanism. The displacement mechanism may communicate with another vehicle device, such as the control module, whereby the control module may actuate the displacement mechanism, during a vehicle dynamic event triggering airbag deployment, based on input from vehicle sensors.

According to an example, the displacement mechanism or actuator may unwind the strap, so that the length of the strap is increased or the strap is extended, so that tension in the strap is reduced or released accordingly. When the actuator is actuated, the strap can extend or unwind from the actuator, reducing or releasing the tension in the strap, depending on the length of strap extended or unwound, permitting the vent hole cover to move to the open position and allow inflation gas to escape through the vent hole. The length of strap extended or unwound may vary based on the input from the vehicle sensors, such that the length may be tailored to crash severity. Thus, the length extended may be tailored to control the amount of inflation gas that is permitted to escape through the vent hole.

According to another example, the actuator of the electromechanical active cushion venting mechanism may be configured to unwind and wind the tether or strap. Thus, during the initial stage of deployment of the airbag cushion, the strap may be in tension to keep the vent hole cover in the closed position and prohibit inflation gas from escaping, thus speeding deployment of the cushion. Then during the intermediate stage of deployment of the airbag cushion, the strap or tether may be unwound to release the tension in the strap or tether, allowing the vent cover to move to the open position and permit inflation gas to escape from the airbag cushion. For example, during a later stage of deployment of the airbag cushion, the strap or tether may be wound to place the strap under tension and to move the vent hole cover to the closed position to prohibit inflation gas from escaping.

According to another example, an electromechanical active cushion venting mechanism includes a vent hole cover or vent cover, a strap or tether, and a displacement mechanism or actuator. The vent hole cover may be configured as discussed herein. The tether may include a first end coupled to the vent hole cover, a second end coupled to the airbag and a mid-portion located between the first and second ends. The mid-portion may include a length limiting mechanism, such as a fold, an eyelet, a slit, a loop, a pinch, or a tear stitch. The length limiting mechanism may provide tension during airbag deployment. During an airbag deploying event, a control module may communicate to the airbag system or module, including the actuator or displacement mechanism, to reduce or remove the tension in the mid-portion by allowing the tether to lengthen, which allows the vent hole cover to move to an open position to permit inflation gas to escape. During deployment, the second end of the strap may remain coupled to the airbag module and/or the first end of the strap may remain coupled to the vent hole cover, which may remain coupled to the airbag cushion. This reduces the possibility of the ends of the strap contacting the occupant during deployment of the airbag cushion.

Figure 6:
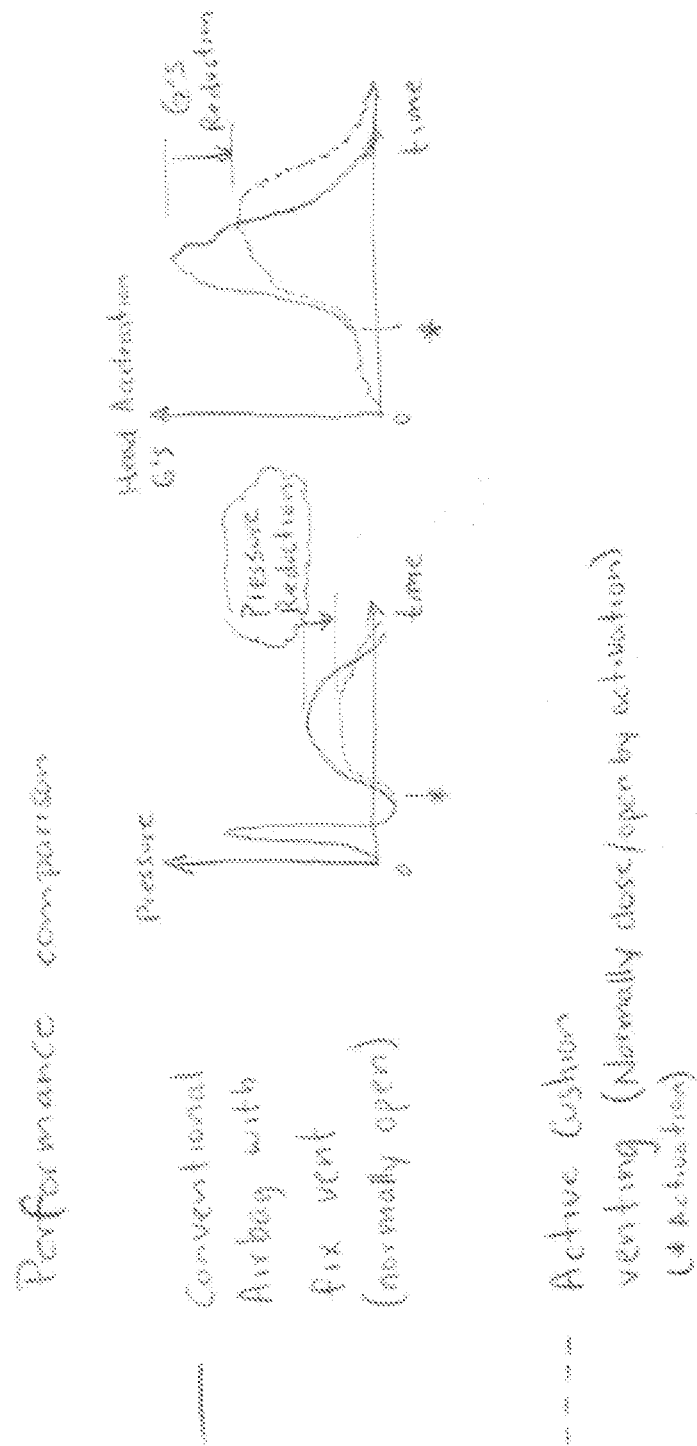
FIG. 6 illustrates a performance comparison between a conventional airbag having a fixed vent and an exemplary airbag system or module, as disclosed in this application, having an electromechanical active cushion venting mechanism.

FIG. 6 includes a graph illustrating pressure over time to compare a conventional airbag having a fixed passive venting system to an exemplary airbag having an electromechanical active cushion venting mechanism, as discussed herein. Additionally, FIG. 6 includes a graph illustrating the head acceleration of an occupant over time to compare a conventional airbag having a fixed passive venting system to an exemplary airbag having an electromechanical active cushion venting mechanism, as discussed herein. The solid lines in FIG. 6 show the performance of the conventional airbag while the dashed lines in FIG. 6 show the performance of the exemplary airbag. As shown in the example of FIG. 6, the exemplary airbag according to the invention can provide a reduction or pressure when an airbag is inflated and a reduced amount of head acceleration, which can reduce the injuries to an occupant, such as head injuries.

Figure 7:
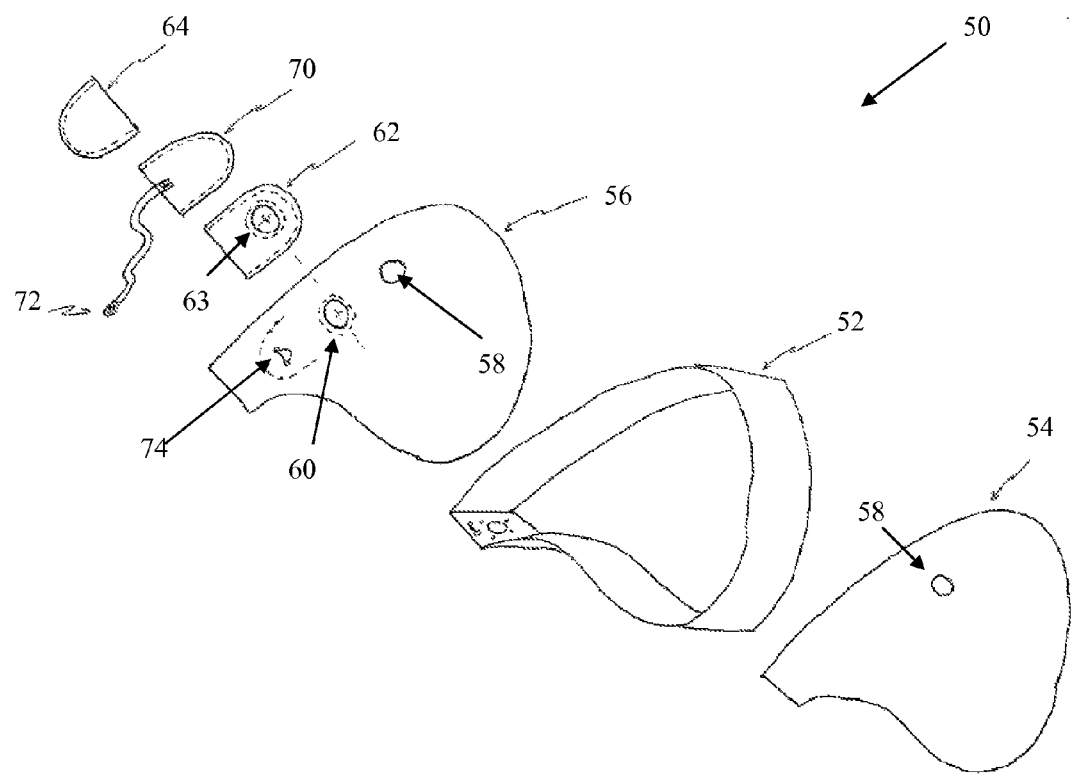
FIG. 7 is an exploded view of another example of an airbag system.

FIG. 7 shows an exploded view of another example of an airbag system 50 with an electromechanical active cushion venting mechanism. As shown in the example of FIG. 7, the airbag of the airbag system 50 can include a main panel 52, one side panel 54, and another side panel 56. One or both of the side panels can include a vent opening or hole 58 and one of the side panels can include an active vent opening or hole 60. According to another example, the vent opening or hole 60 is located in the main panel 52. According to another example, the vent opening or hole 60 is located in any panel of an airbag or in an airbag formed by a single panel. In addition, an airbag can have more than one electromechanical active cushion venting mechanism, such as one on each side of the airbag and in locations according to the design and use of the airbag.

As shown in the example of FIG. 7, a cover base 62 can be connected to a side panel 56 at the active vent opening 60, such as by stitching or other means used in the art. The airbag system 50 can further include a tether 72 connected to a vent cover 70 which is placed over the cover base 62 and the active vent 60. The tether 72 can be directed from an interior of the airbag to an exterior, such as through an opening 74 in the airbag, as shown in the example of FIG. 7. As discussed herein, the vent cover 70 can be located on an exterior surface of the airbag. A pocket 64 can also be provided to cover the opening and at least a portion of the cover 70, such as where the tether 72 is connected to the cover 70. The airbag system 50 can further include an actuator 80 configured to reduce or release tension applied to the tether 72, as shown in the examples of FIG. 8B and FIG. 9B.

The cover base 62 can be, for example, a piece of fabric attached to the side panel 56 around the active vent hole 60. In addition, the cover base 62 can be attached to the cover 70, such as by stitching around the perimeter of the cover base 62 and cover 70, except on one side which remains open for venting. The cover base 62 can improve sealing on the sides of the cover 70. Another advantage of such a configuration is that the improved sealing allows the cover 70 to build up pressure which will help to open the cover 70 at an earlier time after the tension applied to the tether 72 has been reduced or released. The cover base 62 includes a hole 63, as shown in the example of FIG. 7. The hole 63 can be the same size and shape as the vent opening or hole 60 or the size and/or shape of the hole 63 of the cover base 62 can be a different size and/or shape as the vent opening or hole 60, such as to control the flow of inflation gas through the vent opening or hole 60 and the hole 63 and into a space formed between the cover base 62 and the cover 70.

The pocket 64 can be, for example, a piece of fabric attached to exterior of the side panel 56. The pocket 64 can help to keep the vent cover 70 in place during folding of the airbag. The pocket 64 can also improve sealing of active vent cover 70 before the active vent 60 is opened.

Figure 8A:
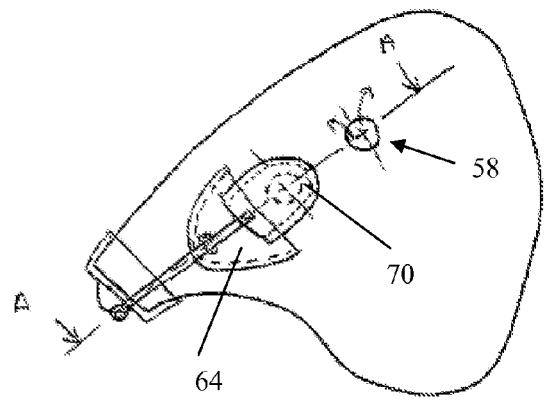
FIG. 8A is a side view of an airbag system with an electromechanical active cushion venting mechanism in a closed position.
Figure 8B:
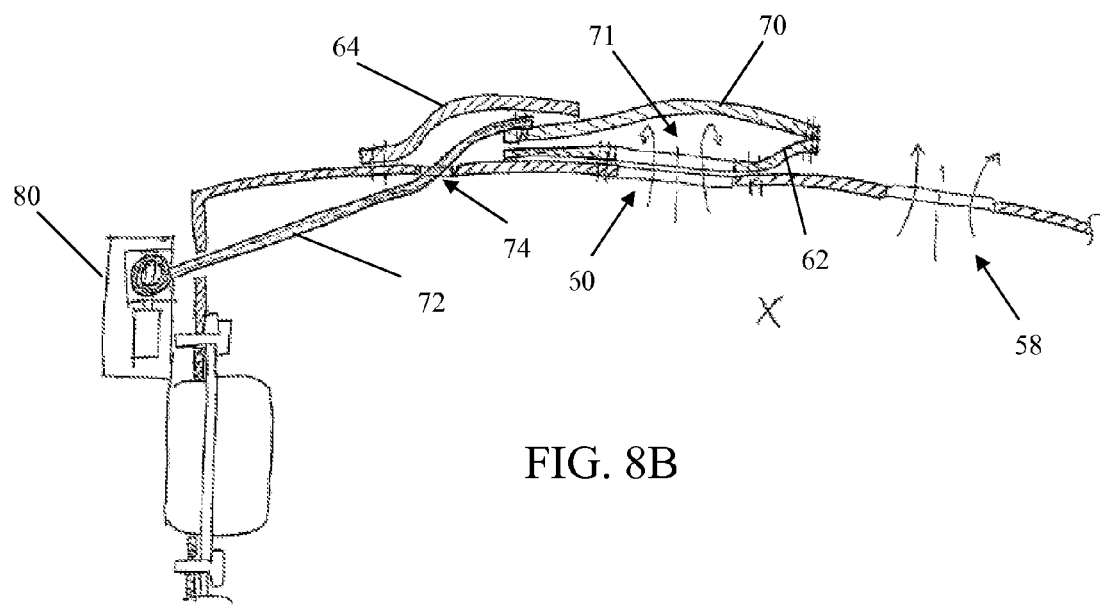
FIG. 8B is a sectional view of the airbag system of FIG. 8A along line A-A.

FIG. 8A shows a side view of an exemplary airbag system in which the cover 70 is in a closed position over the active vent opening 60, such as before an actuator 80 has been activated and tension remains applied to a tether 72. FIG. 8B is a section view of the airbag system of FIG. 8A along line A-A. As shown in the examples of FIG. 8A and FIG. 8B, the pocket 64 can be located over at least a portion of the cover 70, such as where the tether 72 is connected to the cover 70. According to an example, the cover base 62 and the cover 70 can cooperate to provide a clamshell design due to the cover base 62 and the cover 70 being connected to one another and placed on top of one another. As shown in the example of FIG. 8B, a second or additional chamber 71 can be provided between the cover 70 and the cover base 62. The second or additional chamber 71 can become pre-pressurized by inflation gas, which can make movement and opening of the cover 70 to open the vent opening 60 easier. For example, the second or additional chamber 71 can be pre-pressurized before an actuator has been activated to reduce or release tension applied to a tether or the second or additional chamber 71 can become pre-pressurized after an actuator has been activated but before inflation gas within the airbag has moved the cover 70 to open the vent. Further, the pocket 64 can aid in the sealing of the cover 70 and the cover base 62 over the active vent 60, such as by pressing downwards on the cover 70 and the cover base 62 against the panel of the airbag. In addition, the pocket 64 can aid in permitting the second or additional chamber 71 to be pre-pressurized before the cover 70 is moved to permit inflation gas to escape from the vent opening 60, such as by holding or clamping down an edge of the cover 70 and the cover base 62 either before an actuator has been activated or after the actuator has been activated but before the inflation gas has moved the cover 70 to permit inflation gas to escape.

Figure 9A:
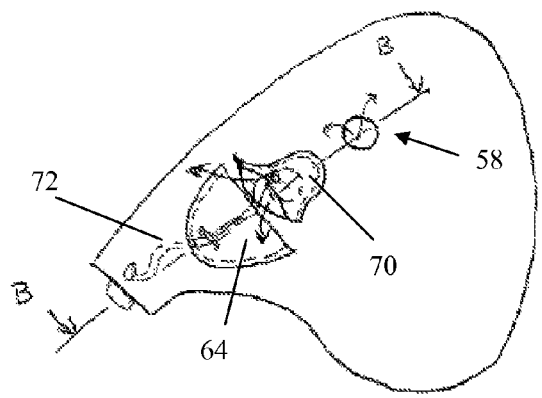
FIG. 9A is a side view of an airbag system with an electromechanical active cushion venting mechanism in an open position.
Figure 9B:
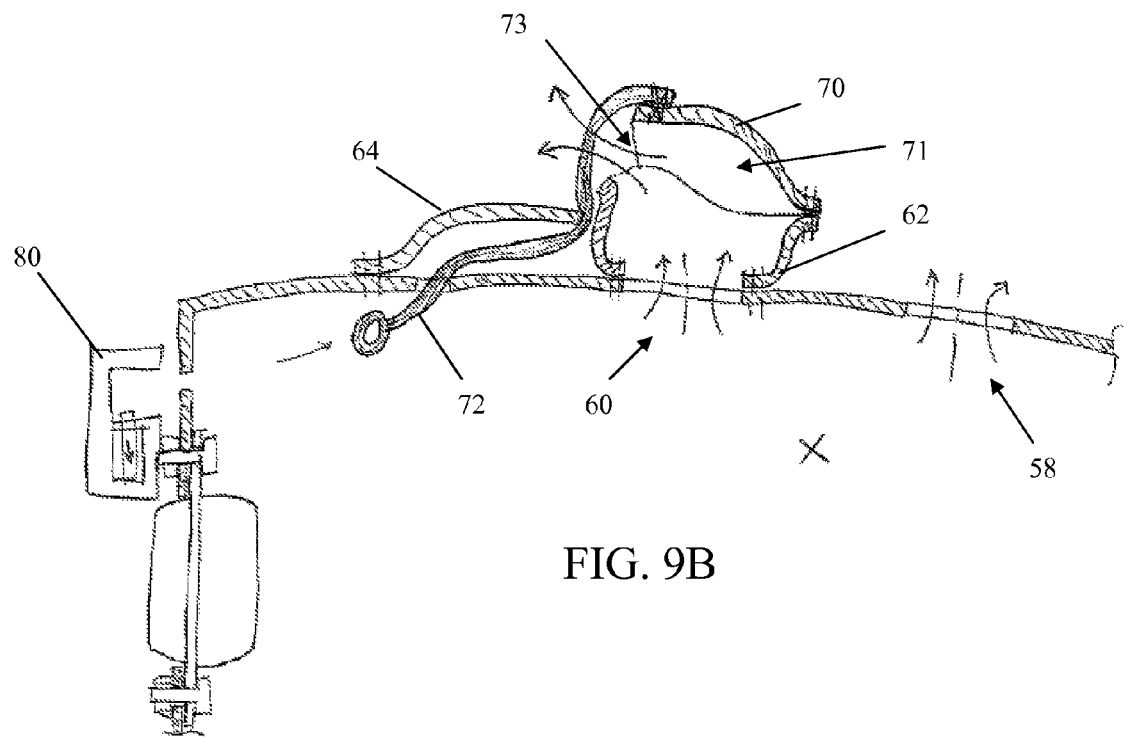
FIG. 9B is a sectional view of the airbag system of FIG. 9A along line B-B.

FIG. 9A shows a side view of an exemplary airbag system in which the cover 70 is in an open position over the active vent opening 60, such as after an actuator 80 has been activated and tension applied to a tether 72 has been reduced or released. FIG. 9B is a section view of the airbag system of FIG. 9A along line B-B. As shown in the example of FIG. 9B, once the tension applied to the tether 72 has been reduced or released the pressure of the inflation gas on the gas side X of the airbag can be sufficient to move or displace the cover 70 to result in the opening of the active vent 60. For example, the inflation gas can cause the secondary or additional chamber 71 to become further pressurized and inflated, causing the cover 70 to move relative to the active vent 60. Further, because the cover base 62 can be connected to the cover 70, when the cover 70 is moved by the force or pressure of the inflation gas, the cover base 62 can also move. For example, the cover 70 and the cover base 62 can be lifted upwards relative to the active vent 60 and the panel of the airbag, as shown in the example of FIG. 9B. The cover 70 and the cover base 62 can cooperate or be joined together, such as in a clamshell configuration, to provide an opening 73 for the inflation gas escaping from the active vent 60 to pass through and exit the airbag. The opening 73 can have the same shape and/or size as the active vent 60 and/or the opening 71 in the cover base 62 or can have a different shape and/or size than both or either of these openings, such as to control or affect the flow of inflation gas.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag modules as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag system for a vehicle, comprising:
   an airbag including a vent and a vent cover configured to close the vent, a pocket panel,
   an actuator, and
   a tether,
   wherein the tether is connected between the actuator and the vent cover such that tension is applied to the tether and the vent cover when the actuator has not been activated,
   wherein, when the actuator has not been activated, the vent is closed by the vent cover due to the tension applied to the vent cover by the tether, and the pocket panel overlaps and is positioned outward of at least a portion of the vent cover,
   wherein, once inflation gas is supplied to inflate the airbag, the actuator is configured to reduce or release the tension applied to the tether when the actuator is activated,
   wherein the vent cover is configured to remain in position when the actuator has been activated until the inflation gas forces the vent open,
   wherein the vent cover is configured to maintain the vent in a closed state when the actuator has not been activated,
   wherein the vent cover is located on an exterior surface of the airbag.

2. The airbag system of claim 1, wherein the tension applied to the tether is sufficient to maintain the vent in a closed state when the actuator has not been activated, despite the inflation gas supplied to inflate the airbag.

3. The airbag system of claim 1, wherein the inflation gas forces the vent open once the actuator has been activated by moving the vent cover.

4. The airbag system of claim 1, wherein the tether includes a loop between the actuator and the vent cover as a length limiting mechanism for the tether.

5. The airbag system of claim 1, further comprising a vent base having an opening, wherein the vent base is located between the vent cover and the vent.

6. The airbag system of claim 5, wherein the vent base and the vent cover form a secondary chamber between the vent base and the vent cover which can be pre-pressurized.

7. The airbag system of claim 1, wherein the vent is an opening in the airbag and the vent cover closes the vent by cover the opening.

8. The airbag system of claim 1, wherein one end of the tether is connected to the actuator and an opposite end of the tether is connected to the vent cover.

9. The airbag system of claim 1, wherein the tether is located within the airbag before and after inflation of the airbag.

10. The airbag system of claim 1, wherein the actuator is a pyrotechnic actuator.

11. The airbag system of claim 1, wherein the actuator is configured to change a length of the tether when the actuator is activated to reduce or release the tension applied to the tether.

12. The airbag system of claim 11, wherein the actuator is configured to increase the length of the tether when the actuator is activated to reduce or release the tension applied to the tether.

13. The airbag system of claim 1, wherein when inflation gas is supplied to inflate the airbag and when the actuator has not been activated, the pocket panel presses against the vent cover to improve sealing of the vent cover over the vent.

14. The airbag system of claim 1 wherein, when the actuator has not been activated, the pocket panel covers a portion of the vent cover that is coupled to the tether.

15. An airbag system for a vehicle, comprising:
   an airbag including a vent and a vent cover configured to close the vent, a pocket panel,
   an actuator, and
   a tether, wherein the tether is connected between the actuator and the vent cover such that tension is applied to the tether when the actuator has not been activated, wherein, when the actuator has not been activated, the vent is closed by the vent cover due to the tension applied to the tether connected to the vent cover, and the pocket panel overlaps and is positioned outward of at least a portion of the vent cover, wherein, once inflation gas is supplied to inflate the airbag, the actuator is configured to reduce or release the tension applied to the tether when the actuator is activated, wherein the vent cover is configured to remain in position when the actuator has been activated until the inflation gas forces the vent open, wherein the vent cover is configured to maintain the vent in a closed state when the actuator has not been activated, wherein the vent cover is located on an exterior surface of the airbag;

wherein at least a portion of the tether extends between the pocket panel and the airbag; and wherein the pocket panel covers an opening through which the tether extends.

16. An airbag system for a vehicle, comprising:
an airbag including a vent, a vent cover configured to close the vent, and a vent base having an opening, the vent base being located between the vent cover and the vent,
an actuator, and
a tether,
wherein the tether is connected between the actuator and the vent cover such that tension is applied to the tether when the actuator has not been activated,
wherein, when the actuator has not been activated, the vent is closed by the vent cover due to the tension applied to the tether connected to the vent cover,
wherein, once inflation gas is supplied to inflate the airbag, the actuator is configured to reduce or release the tension applied to the tether when the actuator is activated,
wherein the vent cover is configured to remain in position when the actuator has been activated until the inflation gas forces the vent open,
wherein the vent cover is configured to maintain the vent in a closed state when the actuator has not been activated,
wherein the vent cover is located on an exterior surface of the airbag, and
wherein the vent base and the vent cover are attached to each other around perimeters thereof to form a secondary chamber between the vent base and the vent cover which can be pre-pressurized by the inflation gas prior to activating the actuator.

17. The airbag system of claim 16, wherein at least a portion of the perimeters of the vent base and the vent cover are not coupled to each other to allow venting from the secondary chamber.

18. The airbag system of claim 17, wherein the vent base and the vent cover are not coupled to each other along a side of the vent cover that is coupled to the tether.

19. The airbag system of claim 16, further comprising a pocket panel, wherein, after inflation gas is supplied to inflate the airbag and when the actuator has not been activated, the pocket panel overlaps and is positioned outward of at least a portion of the vent cover.

* * * * *